A. WILZIN.
AUTOMATIC GLASS GATHERING AND BLOWING MACHINE.
APPLICATION FILED FEB. 25, 1915.

1,297,981.

Patented Mar. 18, 1919.
7 SHEETS—SHEET 1.

Witnesses:
M. J. Whittaker
E. B. Anderson

Inventor:
Arthur Wilzin
per
Haseltine, Lake & Co.
Attorneys

A. WILZIN.
AUTOMATIC GLASS GATHERING AND BLOWING MACHINE.
APPLICATION FILED FEB. 25, 1915.

1,297,981.

Patented Mar. 18, 1919.

Witnesses:
M. J. Whittaker
E. B. Anderson

Inventor:
Arthur Wilzin
per
Haseltine, Lake & Co.
Attorneys.

A. WILZIN.
AUTOMATIC GLASS GATHERING AND BLOWING MACHINE.
APPLICATION FILED FEB. 25, 1915.
1,297,981.
Patented Mar. 18, 1919.
7 SHEETS—SHEET 4.
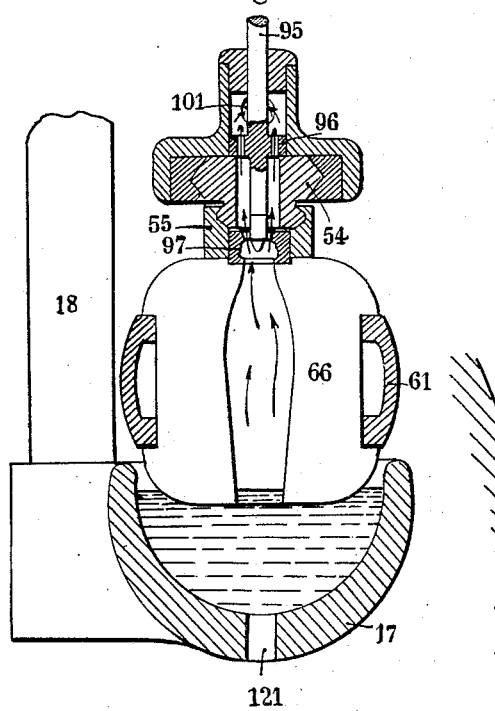
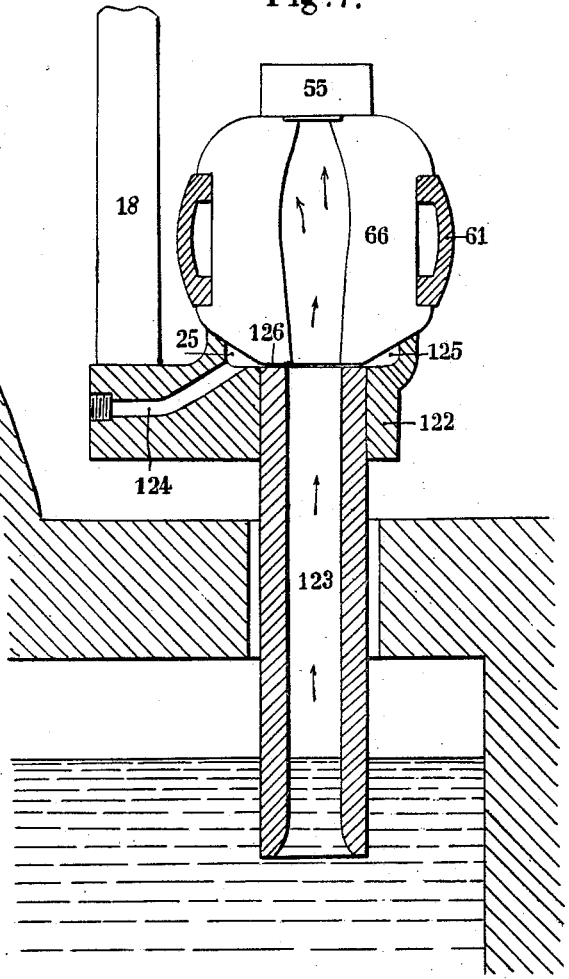
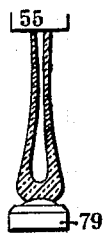
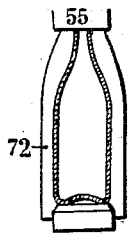

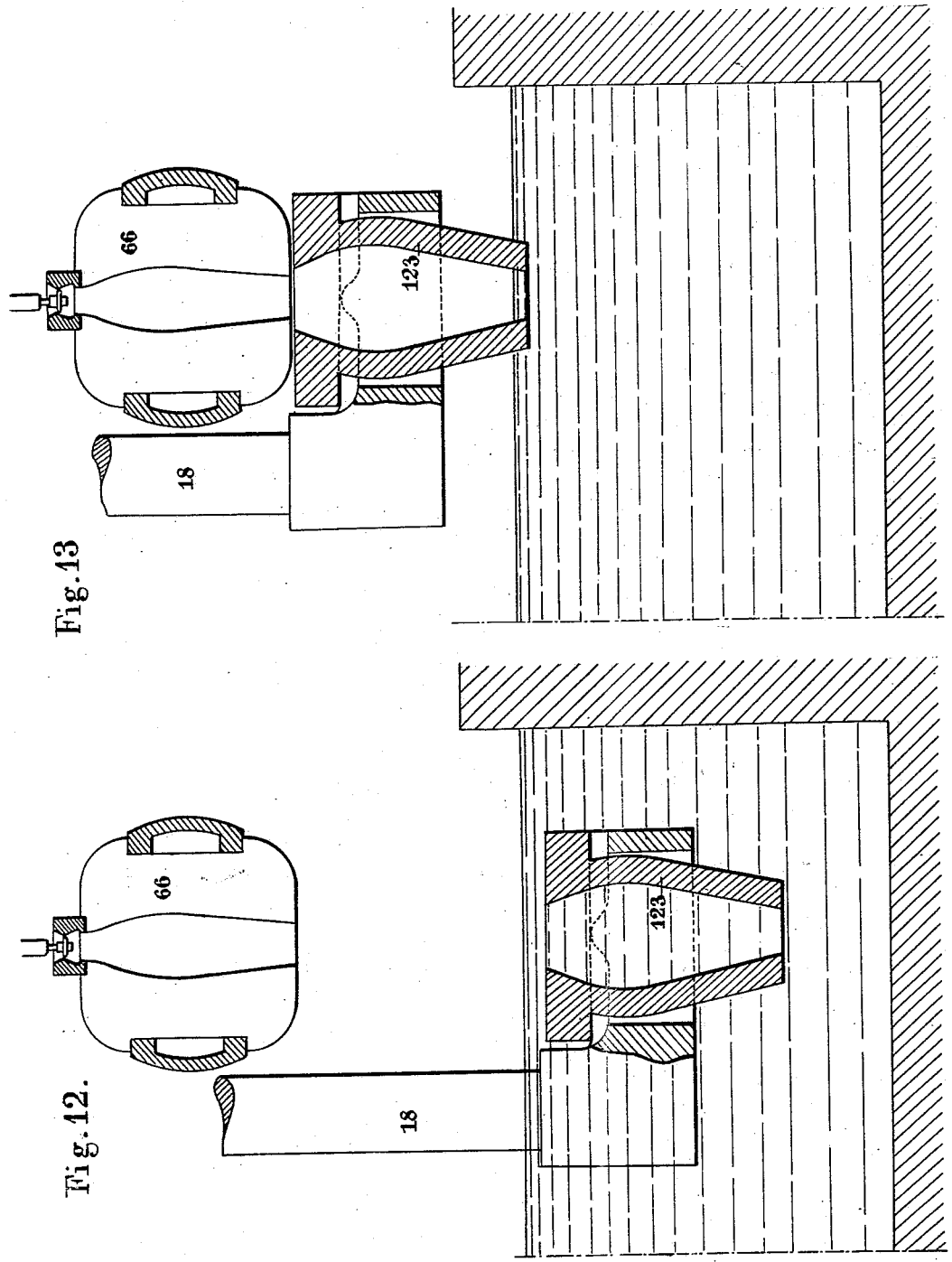

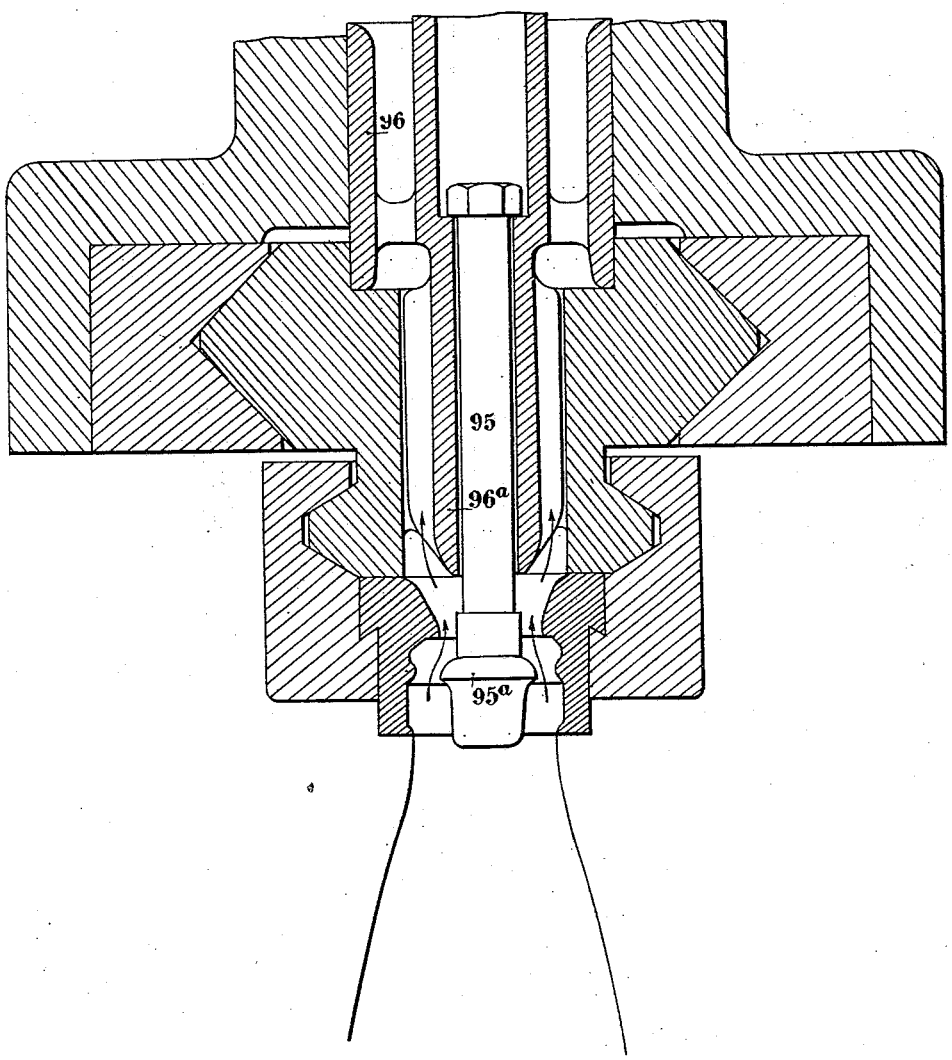

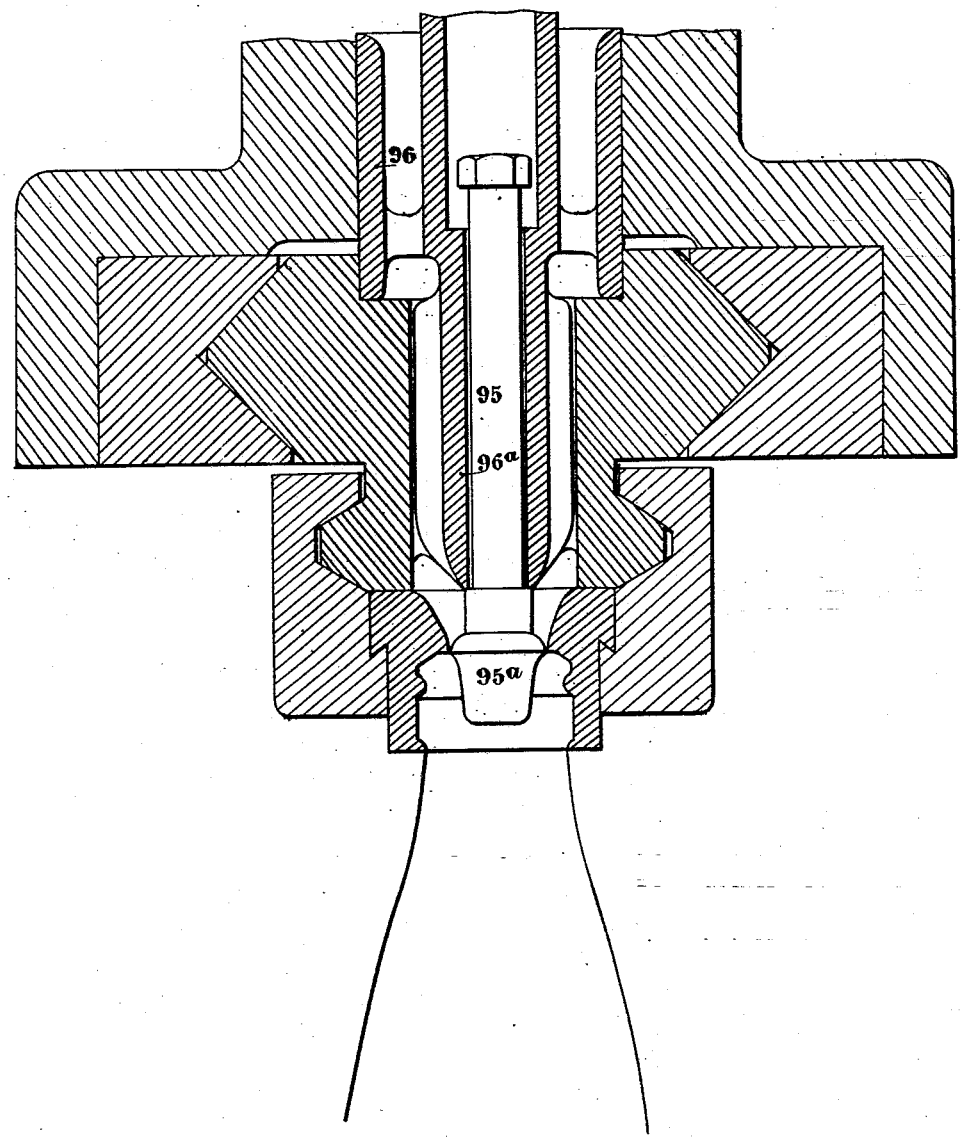

UNITED STATES PATENT OFFICE.

ARTHUR WILZIN, OF ST. OUEN, FRANCE.

AUTOMATIC GLASS GATHERING AND BLOWING MACHINE.

1,297,981.   Specification of Letters Patent.   Patented Mar. 18, 1919.

Application filed February 25, 1915. Serial No. 10,535.

*To all whom it may concern:*

Be it known that I, ARTHUR WILZIN, American citizen, actually residing at 100 Boulevard Victor-Hugo, St. Ouen, Seine, in the Republic of France, have invented or discovered an Automatic Glass Gathering and Blowing Machine, of which the following is a specification.

This invention relates to improvements in that type of automatic machine, for the manufacture of bottles and other hollow glass articles wherein there is provided flexible or adjustable timing of the glass working periods as distinguished from those machines known as "fixed period automatic machines." As an example of the former, reference may be had to my British Patent No. 7,183 of 1912, and my United States Patent No. 1,174,217, granted on an application co-pending herewith.

In the machine forming the subject of my said British patent, provision is made for the ready adjustment of such glass working periods as gathering, blowing of the parison, and final blowing, but in that machine, as in all purely automatic variable period machines in this art of which I am aware, except that disclosed but not claimed in my said U. S. patent, the parison as it leaves the measuring or parison mold is of practically the same length as the finishing mold, and this is a disadvantage for the following reasons: Such a long parison must necessarily for a given weight be very slight in diameter, and thus be exposed to a very severe chilling effect in the parison mold, the surfaces of which are excessive in comparison to the bulk of glass against which they act. In addition, the gathering of long slender parisons calls for special precautions against the chilling effects on the glass of previous mold contacts which would render the glass unfit to rise by suction into the small parison mold opening. For this reason it has heretofore been necessary to use furnaces and gathering devices of various special, intricate and expensive construction and only a glass mixture made especially malleable by large quantities of potash or other expensive solvents, and brought to a very high heat in the furnace can be worked under these conditions, and even then only with an air compressed four or five times higher than suffices in my machine, which means a considerable saving by my machine in fuel for producing compressed air. By using a short parison mold of large inside diameter, which means a short bulky parison, it becomes practicable to pick up the glass direct from the furnace, without the interposition of rotary carriers thereby permitting the use of standard furnaces with but slight and inexpensive changes, and also of inexpensive glass mixtures and ordinary heats.

It is an object of this invention to provide an automatic machine gathering from below and in which the parison as formed in the measuring or parison mold is short and thick as compared to parisons generally and appreciably shorter than the finished article and finishing mold, and to introduce into the cycle of operations of the machine a glass working period during which the parison is permitted to stretch by the influence of gravity before it becomes incased in the final mold. The time required for this free stretching of the parison varies so greatly with the heat and composition of the glass and the weight and shape of the bottles or other articles to be produced that it is of primary importance to be able to readily adjust or vary this period, and it is also an object of the present invention to provide for such ready adjustment.

I am aware that it is old in hand operated machines and semi-automatic machines, to allow a gather or unmolded batch of glass on the end of a blow-pipe to stretch by gravity, and to regulate by such stretching the commencement of certain subsequent operations of the machine. I believe it to be new, however, with me to provide a machine wherein the automatic glass manipulating apparatus includes a parison mold filled from below, and a plurality of glass working periods, and allot one of such periods to the free stretching of the parison by gravity, and to adjust the duration of said period to the rate of said stretching. I believe it to be also new with me to provide in a machine the total duration of the glass working periods of which is constant, a glass working period allotted to the free stretching of a parison by gravity, and to provide mechanism for varying the duration of such period. These features as well as others involving this gravity stretch idea are more particularly pointed out in the accompanying claims.

This invention also provides for the imparting of the initial blowing of the parison after it leaves the measuring mold and before it reaches the final mold, and effecting this initial blowing at a different air pressure from that employed in the final blowing.

Another object of the present invention is to provide in an automatic machine having variable or adjustable glass working periods an organization or arrangement of glass manipulating parts which shall be readily applicable to the common form of glass furnace which provides for the gathering of the glass from above, and which may be used in connection with such furnaces without altering them for the purpose of adapting them to automatic machines, thereby effecting a large capital saving as compared with what is usually required where an existing glass-works is to be fitted up for an automatic bottle blowing plant. In the present machine as distinguished from that disclosed in my said British and U. S. patent, as well as others, the parison or measuring mold occupies a position above the top opening of the glass well of the furnace, and means are provided for the delivery of glass into the parison mold from below.

In the case of the usual automatic bottle machines which pick up their glass from below into the parison molds, a number of units rotate around a set of stationary cams common to them all, so that whenever the molds of any one of the units have to be changed or adjusted, or whenever any one of the units needs repairing, the whole group of machines, including the furnace, must be stopped, thus involving heavy loss in production, fuel and investment. In the case of the present machine if a unit is to be stopped the remaining units and the furnace continue to produce.

In a plant using a plurality of units of the herein-described type, each unit can be made to blow a totally different weight or style of bottle, whereas with the above-mentioned rotary plant, all of the coördinated units must produce the same bottle, which means many sets of molds every time a different bottle is wanted, while in the case of the present machine only one set of molds is needed for each particular shape of bottle to be manufactured.

The present machine also is designed to effect the greatest economy in space measured horizontally, thereby rendering it possible to use a maximum number of machines with a given width of furnace in order to use the glass melting capacity of the furnace to the fullest extent. In order to permit of a large number of machines to be juxtaposed before a furnace, and still leave sufficient space between them to get at the parts, I so combine the constructive features that the actuating and controlling devices are above the mold operating parts, thereby reducing the width of each machine to less than a yard. Each machine is preferably suspended on wheels so as to be readily moved away from the furnace, and from the glass gathering apparatus which is fixed with regard to the furnace, thereby giving easy access to the glass gathering parts for the purpose of their removal and inspection. The suspension of the machine from rails above renders the molds and mold carriers extremely accessible from below, and also facilitates evacuation of the product.

The glass gathering apparatus, though preferably actuated under the control of devices carried by the blowing machine, is structurally separate from same.

Other features of the present invention will appear from the following description, and these together with those already mentioned will be more particularly pointed out in the accompanying claims.

In order to more fully describe my invention, reference will be had to the accompanying drawings wherein:

Figure 1, shown partly on sheet one and partly on sheet two, is a side elevation partly in section of a machine embodying my present invention, showing the same in operative relation to a glass furnace represented in vertical section;

Fig. 2, a front elevation of said machine, without the gathering mechanism;

Fig. 3, a top plan view of the parts shown in Fig. 2;

Fig. 4, a detail top plan of the mold carrying mechanism and the more immediate mechanism for actuating the same, and also the cutting blade and associated parts;

Fig. 5, a detail top plan view of the neck and finishing molds and their carriers, and showing the relative positions of those parts when the two molds are co-acting or in register with each other;

Fig. 6, an enlarged detail vertical sectional view showing the parison or measuring mold in the act of being filled, and illustrating one form of gathering mechanism;

Fig. 7, an enlarged detail vertical sectional view illustrating another form of gathering mechanism;

Figs. 8 to 11, inclusive, represent in a diagrammatic way the condition of the glass at the ends of the four glass working periods, and Figs. 12 to 13, inclusive, show various forms of gathering devices.

Figs. 14 and 15 show details of a neck mold structure.

The glass gathering mechanism as shown herein comprises, among other parts, (see left-hand portion of Fig. 1) a frame 1, carrying in its upper portion a driving shaft 2, having a continuous rotary motion which may be derived from an electric motor or other suitable source. Shaft 2 carries a pinion 3 which meshes with a gear 4 which can be connected or disconnected from shaft 5 by an instantaneous clutch 6, of the well known type which disclutches only after a complete revolution. This clutch normally runs loose, but may become instantly operative to couple the power gear 4 to the shaft 5 by releasing a catch or pawl 7 from the path of a lug or shoulder 6ᵃ on the clutch collar, said catch being at all times under tension toward said collar by spring 8. The release of this clutch whereby the clutch becomes thus coupled is effected through the actuation of a longitudinally slidable rod 9, by a lever 52 bearing against one end thereof, and which lever is in turn operated by a dog 51 rigidly connected thereto and arranged to receive angular motion by engagement with an adjustable cam 50 carried by a controlling disk hereinafter more fully described.

Shaft 5 carries, fast thereon, a pinion 10 meshing with a gear 11 having a crank pin which is operatively connected through links and levers 12, 14 and 15 to a vertically movable slide 13 provided with ready means of attachment to a rod 16 which carries at its lower end a suitable glass conveying device 123. On rod 16 above the ladle is carried a sleeve 18 of material adapted to protect the rod from the effect of the heat of the glass into which it dips. This glass gathering mechanism is located over the well of the glass furnace 1ᵃ and so disposed that the glass conveying device may alternately move upward into operative relation to the measuring mold and then return to the glass again under the reciprocating motion imparted to it from gear 11 through link 12, lever 14 and link 15, when the clutch 6 is coupled. The time at which this operation shall commence is determined by the angular position of cam 50 on control disk 43, and for the purpose of adjusting this time said cam is angularly adjustable on said disk concentrically with its axis, and the duration of the period of operation of ladle 17 is fixed by the length of the contacting surface of said cam with the nose of dog 51, because as soon as said dog passes from engagement with said cam, the latch 7 is permitted to return to the path of clutch shoulder 6ᵃ, and upon engagement with said shoulder uncouples shaft 5 from the power drive.

The glass blowing and molding mechanisms proper of the machine here shown (see Figs. 1, 2 and 3) is suspended from wheels 22 adapted to travel on rails 23 supported by columns 24. The frame of this portion of the machine is composed of two portions the one marked 20 and which is solidly connected with 21 on which the wheels 22 are mounted, and the one marked 19 and 26 which carries the parts actuating and operating the molds, and which by means of the screws 25 may be raised and lowered relatively to the part 20, for the purpose of maintaining the lower end of the measuring molds 66 at always the same level notwithstanding differences in length of the molds, made necessary to suit different lengths of bottles. These screws 25 are actuated by the worm wheels 27 keyed on them, and which receive their motion through the worms 28 on shaft 29 which can readily be operated by hand from the front of the machine. The machine is driven by electric motor 30, carrying a pinion 31 which meshes with gear 32 running free on shaft 33 until it is connected therewith by clutch 34, of the same type as clutch 6, under the influence of cams 48 on controlling disk 43, which cams act on the clutch latch 35 through pawl-lever 49. Shaft 33 carries a pinion 36 meshing with gear 38 keyed on shaft 37 on which are fastened two pinions 39 in mesh with the geared cam-disks 40 and 41 supported on trunnions at the right and left respectively of the main frame 19. The gear wheel 32 also meshes with a gear wheel 42 which transmits its motion to the controlling disk 43 by means of worm 44, worm wheel 45, bevel gears 46 and pinion 47. This controlling disk 43 therefore receives a continuous motion whereas the cam disks 40 and 41 are driven only during the times when the clutch 34 is engaged with the shaft 33, that is to say during the passage beneath the pawl lever 49 of the dogs 48, mounted on the controlling disk 43. Cams 48, as well as the cam 50 which acts upon the clutch of the gathering apparatus, may be moved around the controlling disk, and be fixed at any desirable position thereon or distance from each other. The spaces between the four cams 48 correspond respectively to the four glass working periods of filling the parison mold, initial blowing of the parison, stretching of the parison by gravity, and final blowing, and the time at which any of these shall commence in the cycle of the machine depends upon the angular position of these cams which are adjustable about the axis of rotation of their carrying disks for this purpose. Therefore the duration of these glass working periods may be varied or adjusted by adjusting the positions of cams 48.

The cam disks 40 and 41 are provided on both their faces with cam grooves suitable for opening and closing the several molds, and operating other organs connected with the molding and blowing processes.

The lower part of frame 19 forms V guides in which the neck mold carrier slide 54 may be moved to and fro horizontally. The neck mold is made in halves 55—55 which open and shut by swinging around the pin 56 (Fig. 5). Spring 57 tends to keep the neck mold closed and acts simultaneously on the two pawls 58 and 59 forcing them against the two stops 58ª.

Extending downward from the frame 19 are two hollow columns 60 (Figs. 2 and 4) around which are fulcrumed two arms 61, carrying at one end of each, half of the parison or measuring mold 66, and hinged at their other ends with the links 63 and 64 which connect with a reciprocating slide 65. From Fig. 4 it will be readily seen that the movement of this slide will bring about the opening and closing of the arms 61 and consequently of the parison mold halves (66).

One of the arms 61 carries a vertical shaft 68ª, at the upper end of which is fastened the lever 68, and at the lower end of which the arm 67 may be fastened at different heights to suit the lower level of the measuring molds. This arm 67 is provided with a cutting blade 69, designed to separate the glass in the measuring mold from that in the gathering ladle, and at the same time close the opening of the parison mold when filled. The lever 68 is actuated by means of one of the cam grooves on cam wheel 40 through the lever 71 and the connecting rod 70.

The finishing mold halves 72 and 73 are swung on stud 74 (Figs. 4 and 5), and are opened and shut by links 75 and 76 connected with links 63 and 64, the reciprocating movements of which act simultaneously upon the finishing mold, and on the parison mold.

Around one of the hollow columns 60 swings a double armed piece 77 at the two ends of which are respectively mounted the bottoms 78 and 79 which coöperate, one with the parison after it leaves its measuring mold, and the other with the finished mold. This arm is actuated by a vertically reciprocated rod 114 within the hollow column 60, and which rod is connected with 77 by a pin 80 which traverses the walls of column 60 by means of a cam-slit 81 curved in such a way that 77 descends straight to begin with, then swivels around so as to free the glass objects from their bottoms 78 and 79, thus permitting the blown bottle to drop into the cooling pot 82. This cooling pot is adapted to swing on trunnions fastened in a bracket 84 which is fixed at the end of the columns 60 (Figs. 1 and 2). The up and down movement of a rod 115 passing through the center of one of these columns, and connecting through lever 87 with a geared sector 86 which meshes with pinion 85, causes the forward and backward swinging of the pot 82. A knock-out pad 89 carried by this pot receives a blow from lever 90 while the pot is in its inclined position, thus ejecting the bottle on the inclined plane 91 which leads to the annealing furnace. The lever 90, fulcrumed at 92 receives its motion through lever 94 and connecting rod 93 (Figs. 1 and 2).

The slide 54 carrying the neck mold is adapted to move in a horizontal plane with stoppages at three points:

1. In line with the axis of the parison mold 66,
2. In line with the axis of the bottom mold 78,
3. In line with the axis of the finishing mold 72.

During these three stoppages occur the different operations described farther on.

Above the center of the neck mold in its first stoppage position, the plunger 95 (Fig. 6) guided in a projection of the main frame 19, and carrying with it the perforated inlet disk 96, receives its up and down motion through lever 102 (Fig. 1) which is actuated by one of the cam grooves on wheel 40. The inlet disk 96 is brought to bear with considerable pressure against the slide 54 while the end of the plunger is within the neck mold, so as to insure the minimum of air leakage through the guides of 54 during the period of exhausting the air from the finishing molds. 98 is a pipe connecting a vacuum tank with the orifice 101 above the inlet disk 96, and 99 is a valve behind orifice 101. When the plunger 95 descends, a dog 100 vertically adjustable on same strikes the valve stem 99, thus starting the exhaust at the requisite moment.

In its second stoppage position the neck mold stops beneath a valve box 103ª connecting by pipe 104 with an air pressure tank, the opening of the valve being obtainable by the pressing down of the lever 102 on valve stem 103 thus letting compressed air into the depression previously formed at the top of the parison by the end of plunger 95.

When the neck mold has reached its third stopping place in line with the axis of the finishing mold, it is beneath a valve box 105ª connected with an air-pressure tank (having a different degree of pressure from the first) the admission of air to do the final blowing of the bottle being obtained by lever 102 pressing on valve stem 105. This final blowing, however, does not take place until the parison has been allowed to stretch its full length (see Fig. 10) by gravity and thus come into engagement with the final bottom mold 79. The period for this free stretching of the parison, for the purposes hereinbefore set forth may be varied by varying the distance between the adjacent ends of the two cams 48 which determine the particular glass working period.

Valve stems 103 and 105 may be operated by adjustable cams on controlling disk 43 instead of by lever 102 as shown. The neck mold carrier slide 54 is actuated by a cam groove (shown in Fig. 1) in which slides a roll at the end of lever 106, said lever being connected by link 107, lever 108 and rod 109 to the slide 54 (Fig. 1). Another cam groove in which slides the roll at the end of lever 110 actuates through links 111 the slide 65 which operates the opening and closing of the parison and finishing molds.

The innermost cam-groove shown in Fig. 1 acts upon lever 113 thereby moving up and down the rod 115 which passes through the hollow column 60 to levers 87 and sector 86, thus reversing the cooling pot 82. A similar arrangement of lever 112 and rod 114 (Fig. 2) actuates the movements of bottom molds 78 and 79 mounted on the swinging arm 77.

Fig. 1 clearly shows how one of the cam grooves acts on lever 71 and through link 70 and levers 68 and 67 (Fig. 4) on the cutting-off blade 69.

Lever 116 applied by spring 118 (Fig. 1) to a cam surface communicates through rod 93 a short and rapid motion to lever 90, thereby insuring the ejection of the bottle out of pot 82.

The opening of the neck-mold is not produced by cam action from wheels 40 and 41. It is brought about in the following manner shown in Fig. 5.

On top of the finishing mold carriers 73 are fastened the pins 119 and 120 which when the finishing mold closes, slip in behind the spring pawls 58 and 59 mounted at the outer ends of the neck mold carrier 55. When the finishing mold opens the pins act against these pawls in such a manner as to open the neck mold at the requisite moment for dropping the bottle into the cooling pot 82.

Fig. 6 shows a form of gathering ladle 17 which may be used if desired. This ladle, which is filled with molten glass, is lifted bodily into contact with the bottom of the parison mold 66 at the moment when plunger 95 descends and occasions the opening of valve 99 thus connecting the interior of the parison mold with the vacuum tank, and thereby sucking in the glass. The ladle 17 has an opening 17ª in its bottom which permits glass to drain from the ladle, and to circulate therethrough when the ladle is immersed in the molten glass, thereby preventing an accumulation of cold glass therein. As soon as the mold is full, ladle 17 descends allowing blade 69 to shear off the contents from the glass string connecting it with the ladle glass.

In Fig. 8 is shown the parison suspended from the neck mold after having been sheared off at the bottom and after the opening of the parison or measuring mold.

Fig. 9, shows the parison at its intermediate stopping position still suspended from the neck mold and after being blown slightly while the preparatory bottom mold 78 shapes its lower part in a preliminary way.

Fig. 10, shows the parison after having stretched its full length under gravity into engagement with the final bottom mold 79.

Fig. 11, shows a bottle fully blown in the finishing mold 72.

Fig. 7 shows another gathering device, embodying a vertically movable tubular body 122 and 123, the lower end of which always remains in the glass of the furnace while the upper end is alternately moved against and away from the lower end of the mold. This form of gatherer may be combined with the air-pressure shearing-off device as shown, and which will be understood from the following description.

Figure 1:
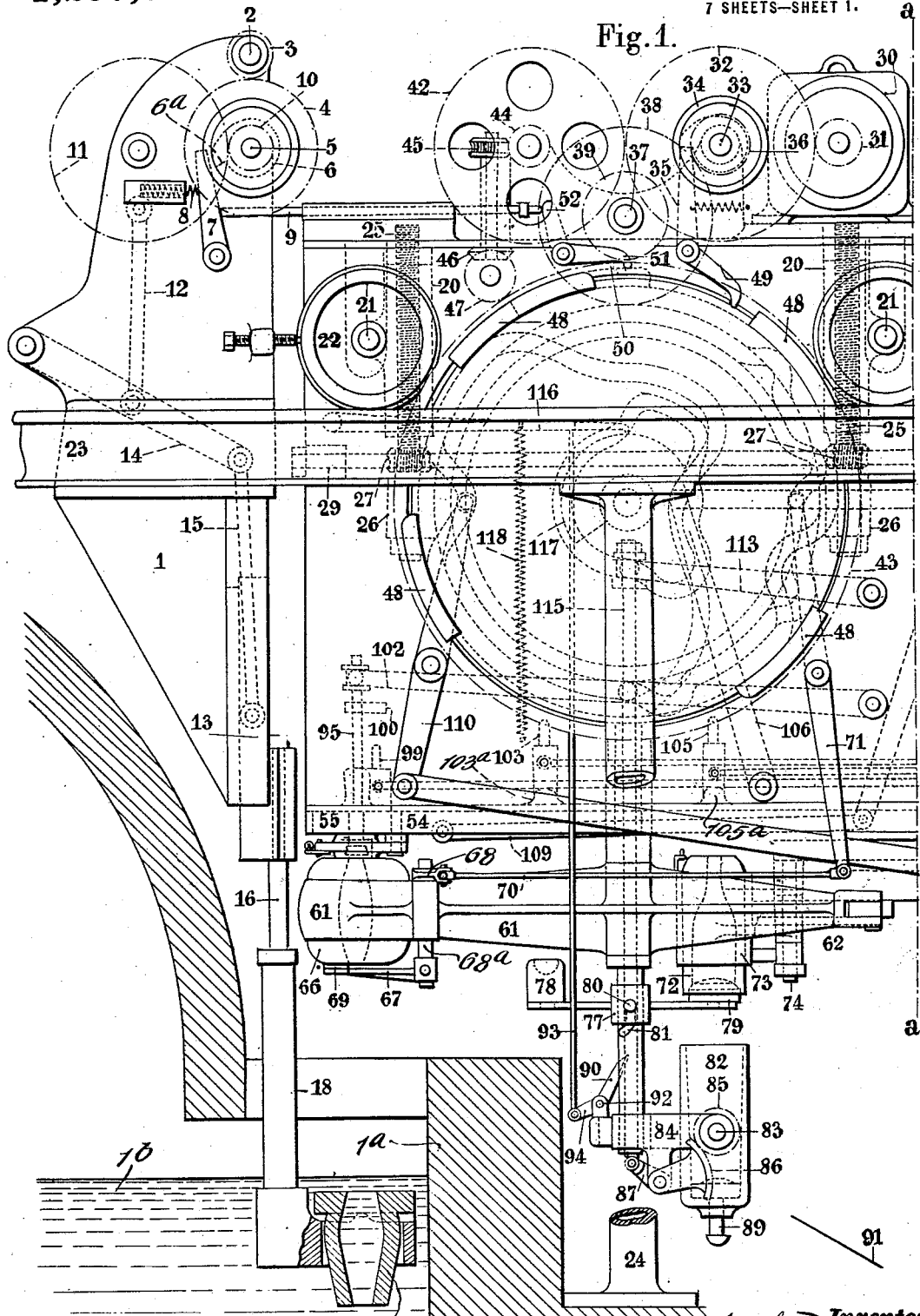
Figure 2:
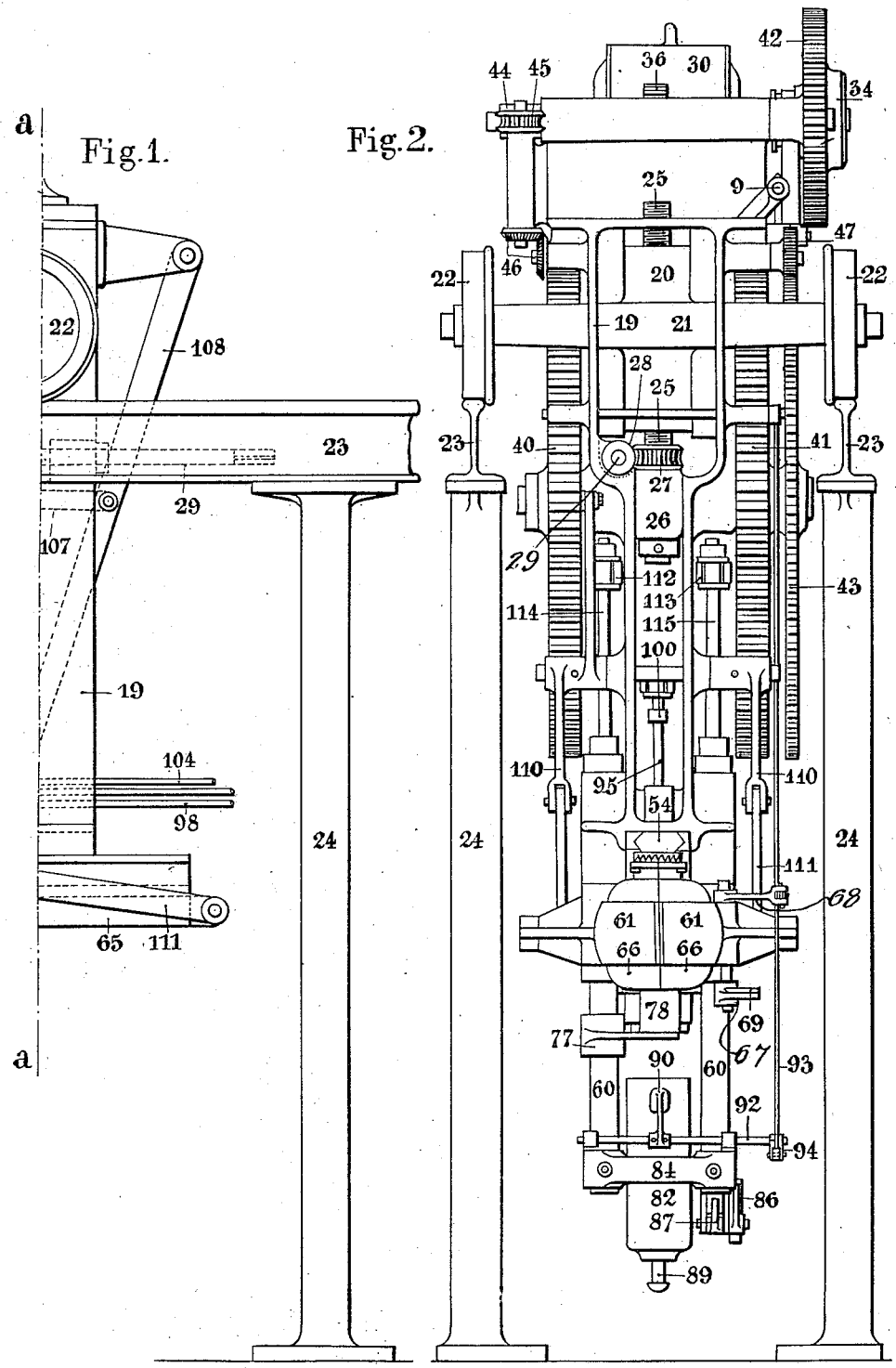
Figure 3:
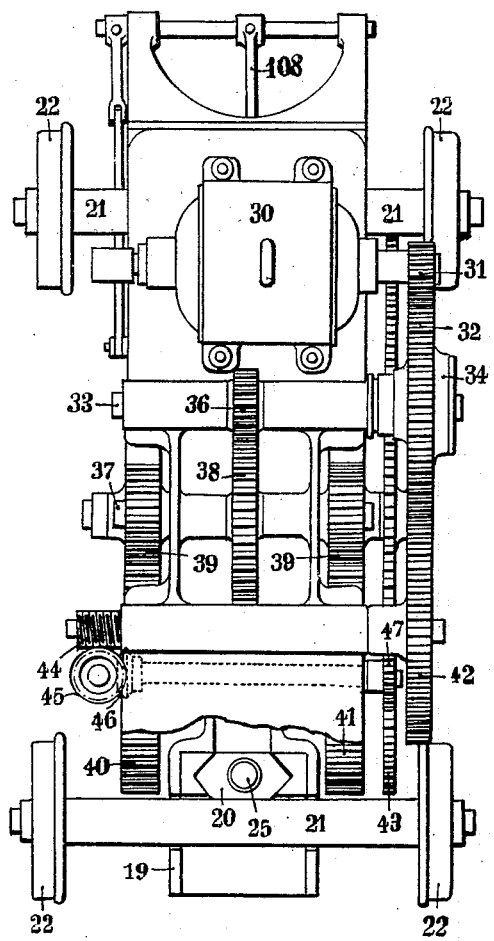
Figure 5:
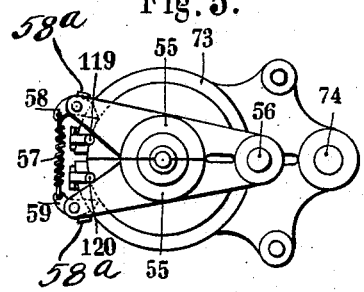
Figure 4:
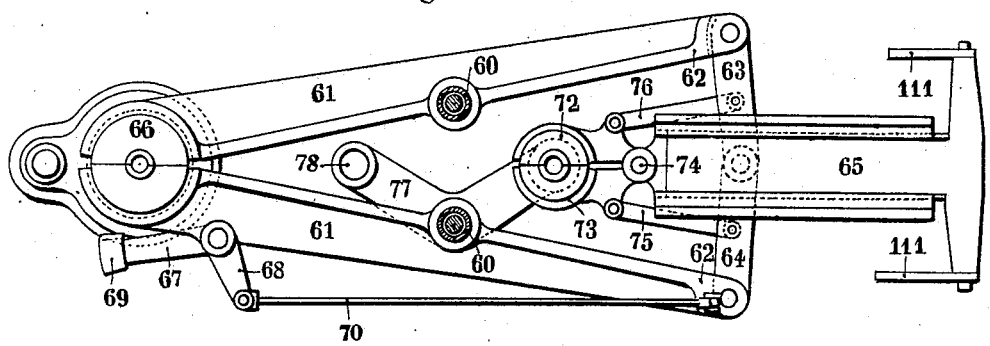

Fig. 7 shows the gathering device at the moment when the air is being exhausted from mold 66. The rod 18 has brought annular surface of support 122 against the outer surface of the parison mold with sufficient pressure to form a fairly tight joint between them. In this position a thin annular chamber is formed above tube 123. As soon as the glass, owing to the exhausting of the air in 66 and 123 has mounted up into the neck mold 55, a valve is automatically opened (for instance by means of a boss on the controlling wheel or on one of the cam wheels) which allows highly compressed air to enter 124 and 125 and extend in a thin film between the contiguous surfaces of 123 and 126, and thus separate the glass in 66 from that beneath like a thin blade acting all around it at once. The tubular gathering apparatus may however also be combined with a metallic shearing device such as shown in Fig. 1 at 69.

Figs. 12 and 13 show in detail the tubular gathering device. Instead of introducing only the lower end in the molten glass as shown in Fig. 7, the entire tubular body is submerged beneath the level of the glass in the furnace after each contact with the measuring mold, for the purpose of more thoroughly reheating the entire tube and completely renewing or reheating its contents.

The plunger 95 which indents the upper end of the parison mold whereby to start the flow of the compressed air when blowing the article is in (Figs. 14 and 15) shown in a modified arrangement. Instead of entering the neck mold to such depth only as corresponds with the depth of the imprint it is to make in the parison, it projects quite a little deeper at the time when the air in the measuring mold is to be exhausted and takes its proper mold relation to the neck-mold (Fig. 15) only as the glass rises to fill said neck-mold. The purpose of this is to increase the section through which the air exhaust takes place. In the case of a vertically stationary plunger, this section is restricted to the annular space between the plunger and the neck mold, which in order to obviate heavy burs on the lip of the bottle cannot exceed 1/100" in width. With such a very slight section, it is hard to avoid inefficiency in the exhaust whenever even slight leakages make themselves felt along the mold joints, whereas with a plunger arranged as shown in Fig. 14, where the exhaust takes place through a wide annular space, the harmful effect of leakage is greatly diminished. The plunger may be loosely suspended in $96^a$ as shown in Fig. 14 and be pushed up to its proper molding position by the glass as it rises in the mold under the suction of the vacuum, or it may be pulled back into the working position shown in Fig. 15 by automatically releasing at the requisite moment a spring which had been compressed when the plunger was pushed down into the position shown in Fig. 14.

Still another way of automatically drawing up the plunger 15 at the requisite moment is to connect it with a piston above, adapted to move in a cylinder, the upper portion of which communicates with the interior of the parison or neck mold, whereas the space below the piston is open to the atmosphere. As soon as the vacuum in the parison mold, and consequently above the piston attains the desired degree the piston and with it the plunger 95 will be pushed up by the atmospheric pressure.

The construction features described in the above specification are given by way of example only. It will be understood that the details of many of the combinations may be varied without affecting the principles of the present invention.

Having now particularly described and ascertained the nature of my said invention and in what manner the same is to be performed, I declare that what I claim is:—

1. A machine for the manufacture of hollow glass articles, comprising a measuring mold, a preliminary bottom mold located to receive the parison after leaving the measuring mold, a finishing bottom mold located at a lower level when contacting with the glass than the said preliminary mold when it contacts with the glass, automatically operated means to transport the parison suspended by its neck from register with one of said bottom molds into register with the other of said bottom molds, and adjustable timing means to allow said parison to stretch by gravity into contact with said finishing bottom mold.

2. A machine for the manufacture of hollow glass articles, having a relatively short parison or measuring mold and a longer finishing mold, means to transport a parison suspended by its neck from one of said molds to the other, means to impart initial blowing to the parison after it leaves the measuring mold and before it reaches the finishing mold, and flexible or adjustable timing means adapted to permit of the free stretching of said parison to substantially its finished length, and mechanism for effecting a final blowing of the parison after said stretching.

3. A machine for the manufacture of hollow glass articles, provided with automatic glass blowing apparatus having two members arranged to contact separately and at different times with the bottom of the article being formed and at different elevations from each other, mechanism to suspend the incompleted article over said members successively, and mechanism to time the interval between two succeeding operations on the article to permit the same to stretch under the action of gravity into contact with the lower of said members.

4. In a machine for the manufacture of hollow glass articles, a neck mold adapted to move in a fixed path of travel, a plurality of ports located along said path of travel to register with said neck mold, and to supply thereto compressed air under different pressures, means for moving said neck mold in said path of travel, and causing the same to stop when in register with each of said air ports, and adjustable mechanism adapted to vary the duration of each stoppage period.

5. In a machine for the manufacture of hollow glass articles, the combination with a glass furnace having an opening for the withdrawal of glass therefrom upward, of a glass conveying device mounted for vertical reciprocating movement through said opening, a parison mold located above said opening and having a filling opening in the bottom thereof, said glass conveying device coöperating with said parison mold to fill the same with molten glass during a period in the operation of the machine, a finishing mold the interior working shape of which exceeds that of the parison mold in length, a control device having a movement imparted thereto corresponding to the cycle of manufacture for controlling the movements of the molds and the working periods of the machine, and adjustable means carried by said control device for varying the duration of the working period during which the parison stretches to the length of the finishing mold.

6. The combination with a glass furnace, of automatic means intermittently acting to lift a supply of glass from said furnace, a carriage mounted above the glass level of said furnace, and mounted to travel horizontally toward and away from the same, glass working mechanism suspended from said carriage and including a measuring mold, a supporting structure for said mold adapted to hold the same over the glass in said furnace, a finishing mold and a neck mold, and mechanism to cause said neck mold to travel from said measuring mold to said finishing mold and vice versa.

7. The combination with a glass furnace having an opening for the withdrawal of glass therefrom upward, a glass conveying device mounted for vertical reciprocating movement with respect to said opening, mechanism to impart intermittent vertical motion to said device and mounted upon a fixed support above said opening, a carriage mounted for horizontal movement toward and away from said furnace and including a measuring or parison mold adapted to lie over the glass opening of said furnace when said carriage is at the end of its travel in the direction toward said opening, a finishing mold supported by said carriage, mechanism for automatically opening and closing said molds, mechanism carried by said carriage adapted to automatically time the supplying of glass to said parison mold with respect to the opening and closing of the latter, a control device carried by said carriage which has a movement imparted thereto corresponding to the cycle of manufacture for controlling the movements of said molds and the working periods of the machine, and adjustable contact pieces mounted on said control device for adjusting the working periods of the machine relative to each other.

8. The combination with a glass furnace having an opening for the withdrawal of glass therefrom upward, a glass conveying device mounted for vertical reciprocating movement with respect to said opening, mechanism to impart intermittent vertical motion to said device and mounted upon a fixed support above said opening, a carriage mounted for horizontal movement toward and away from said furnace and carrying a measuring or parison mold adapted to lie over the glass opening of said furnace when said carriage is at the end of its travel in the direction toward said furnace, mechanism for automatically opening and closing said mold, and mechanism carried by said carriage adapted to automatically time the supplying of glass to said mold and the opening and closing of the latter, the connection between the timing mechanism on said carriage and the glass delivery mechanism being effected by the return of the carriage to the end of its travel toward the furnace and self disconnecting when said carriage is moved in a direction away from said tank.

9. An automatic glass gathering, blowing and shaping machine, comprising in combination a container for molten glass, a parison mold above this container, said parison mold having an opening in the bottom thereof, tubular glass conveying means for placing the bottom of said parison mold in communication with the glass in said container, means for creating a sufficient degree of vacuum in the parison mold to cause the glass to rise into and fill same through its bottom opening, a finishing mold, means of presenting, inclosing and blowing the parison in said finishing mold, a control apparatus driven at the rate of the cycle and adjustable means carried by this control apparatus adapted to vary the duration of each of the mold contact periods and shaping or blowing phases in relation to the total duration of the cycle.

10. An automatic glass blowing machine embodying in combination, a vertically split measuring mold constantly maintained in the same position vertically and horizontally during the entire cycle, a vertically split finishing mold also constantly maintained in the same position during the entire cycle, means for opening and shutting these molds, a neck mold shifted horizontally between the measuring and finishing molds, means for stopping the neck mold at a point between the measuring and finishing molds, a preparatory bottom mold corresponding in its working position with the intermediate stoppage point of the neck mold, a final bottom mold coöperating with the finishing mold, and means for vertically and horizontally shifting these bottom molds.

11. An automatic gathering and glass blowing machine embodying in combination, a vertically split measuring mold constantly maintained in the same position vertically and horizontally during the entire cycle, a vertically split finishing mold also constantly maintained in the same position during the entire cycle, means for opening and shutting these molds, a neck mold shifted horizontally between the measuring and finishing mold, means for stopping the neck mold at a point between the measuring and finishing molds, a preparatory bottom mold corresponding in its working position with the intermediate stoppage point of the neck mold, a final bottom mold coöperating with the finishing mold, means for vertically and horizontally shifting these bottom molds, and a cooling pot adapted to receive the finished article, retain it during the next cycle and then eject it.

12. An automatic glass gathering and blowing machine comprising means for operating upon the glass, actuating cams for said means located thereabove, driving means for said cams located above the same, and supporting rails, the entire structure being suspended below and horizontally movable on said rails.

13. In an automatic glass gathering and blowing machine taking up its glass from below, a tubular body, the lower edge of which remains constantly immersed in the glass of the furnace in combination with means for raising said tubular body so as to bring its upper end in contact with the bottom of the measuring mold while the air is being exhausted in said measuring mold, and means for lowering the tubular body out of contact with this mold as soon as it is filled with glass.

14. In an automatic glass gathering and blowing machine taking up its glass from below, a tubular body the lower end of which remains constantly immersed in the glass of the furnace in combination with means for raising said tubular body so as to bring its upper end in contact with the bottom of the measuring mold while the air is being exhausted in said measuring mold, and means for lowering the tubular body so as to entirely submerge it beneath the glass in the furnace.

15. In an automatic glass-gathering and blowing machine, a plunger arranged to enter more deeply into the neck mold while same is above the still empty parison mold than corresponds with its normal molding relation with the neck-mold, an inwardly extending shoulder or depression above that line of the plunger which corresponds with the top of the cavity in the neck-mold when the plunger is in its normal or molding position, and means of exhausting the air in the measuring and neck-molds through the opening thus formed between the plunger and neck-mold while the plunger is in its lowered position.

16. In an automatic glass-gathering and blowing machine, a plunger arranged to enter more deeply into the neck-mold while same is above the still empty parison mold than corresponds with its normal mold relation with the neck mold, an inwardly extending shoulder or depression above that line of the plunger which corresponds with the top of the cavity in the neck mold when the plunger is in its normal or molding position, and means of exhausting the air in the measuring and neck-molds while the plunger is in its lowered position, and means of raising the plunger to its working position while the glass is rising in the parison mold.

The foregoing specification of my improved automatic glass gathering and blowing machine, signed by me this 5th day of February 1915.

ARTHUR WILZIN.

Witnesses:
De Witt C. Poole, Jr.,
S. A. Koski.